United States Patent
Luo et al.

(10) Patent No.: US 9,876,734 B2
(45) Date of Patent: Jan. 23, 2018

(54) METHOD AND SYSTEM FOR PROCESSING RSVP-TE SIGNALING

(71) Applicant: ZTE CORPORATION, Shenzhen, Guangdong Province (CN)

(72) Inventors: Chun Luo, Shenzhen (CN); Qingsong Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 58 days.

(21) Appl. No.: 14/903,285

(22) PCT Filed: May 21, 2014

(86) PCT No.: PCT/CN2014/077970
§ 371 (c)(1),
(2) Date: Jan. 7, 2016

(87) PCT Pub. No.: WO2014/173348
PCT Pub. Date: Oct. 30, 2014

(65) Prior Publication Data
US 2016/0380910 A1  Dec. 29, 2016

(30) Foreign Application Priority Data
Jul. 11, 2013  (CN) .......................... 2013 1 0290618

(51) Int. Cl.
| H04L 12/28 | (2006.01) |
| H04L 12/913 | (2013.01) |
| H04L 12/803 | (2013.01) |
| H04L 12/715 | (2013.01) |

(52) U.S. Cl.
CPC .......... H04L 47/724 (2013.01); H04L 47/125 (2013.01); H04L 45/04 (2013.01)

(58) Field of Classification Search
CPC .... H04W 80/04; H04W 8/26; H04L 29/0653; H04L 29/06095; H04L 49/3009; H04L 49/309; H04L 45/74; H04L 12/56; H04L 2012/56
USPC ......................................... 370/348, 392, 389
See application file for complete search history.

(56) References Cited

U.S. PATENT DOCUMENTS

| 2003/0133412 A1 | 7/2003 | Iyer et al. |
| 2006/0083251 A1 | 4/2006 | Kataoka et al. |
| 2006/0140190 A1* | 6/2006 | Lee .................. H04L 45/04 370/395.3 |

(Continued)

FOREIGN PATENT DOCUMENTS

| CN | 101326791 A | 12/2008 |
| CN | 101640637 A | 2/2010 |
| EP | 1443733 A2 | 8/2004 |

(Continued)

*Primary Examiner* — Brenda H Pham
(74) *Attorney, Agent, or Firm* — Ling Wu; Stephen Yang; Ling and Yang Intellectual Property

(57) ABSTRACT

A method and system for processing RSVP-TE signaling, including: extending an object using unnumbered resources within an RSVP-TE signaling, representing link resources in the signaling with a triple consisted of an area ID, a router ID and an interface; when configuring network resources, configuring each area ID to be different, while an intra-area router ID to be unique; representing resources in a signaling message with the triple when applying cross-area services.

8 Claims, 4 Drawing Sheets

(56) References Cited

U.S. PATENT DOCUMENTS

| | | | |
|---|---|---|---|
| 2010/0002605 A1* | 1/2010 | Amemiya | H04L 45/04 370/254 |
| 2011/0229123 A1* | 9/2011 | Li | H04L 41/0668 398/5 |

FOREIGN PATENT DOCUMENTS

| | | |
|---|---|---|
| EP | 1713197 A1 | 10/2006 |
| EP | 1921813 A2 | 5/2008 |
| JP | 2006324902 A | 11/2006 |
| JP | 2008160721 A | 7/2008 |

* cited by examiner

METHOD AND SYSTEM FOR PROCESSING RSVP-TE SIGNALING

TECHNICAL FIELD

The present document relates to the field of network communications, and more particularly, to a method and system for processing Resource Reservation Protocol-Traffic Engineer (called RSVP-TE) signaling.

BACKGROUND OF THE INVENTION

The MPLS-TE (Multi-Protocol Label Switching-Traffic Engineer) combines the advantages of multi-protocol label switching technology and traffic engineering technology, achieves dynamic adjustment and optimal allocation of network bandwidth resources in the packet switching and the 2-Layer switching, thus solves the network congestion problem. The GMPLS (Generalized Multi-Protocol Label Switching) is a further extension of MPLS-TE, which can not only support the IP (Internet Protocol) packet switching, but also support slot switching, wavelength switching and space switching (such as optical fiber switching and interface switching). Both the MPLS-TE and the GMPLS flood link resources through the routing protocol, before establishing a service, a display route is calculated, and the service is established through the signaling protocol. Both the MPLS-TE and the GMPLS proposed to use the unnumbered method to represent the link resources, and an unnumbered link refers to a link whose link interface does not have an IP address, and is represented with an Unnumbered Interface ID in a local network element.

The RSVP-TE (Resource Reservation Protocol-Traffic Engineer) is the existing signaling protocol which is most widely used, in the RFC3477, a method of using unnumbered link resources in the RSVP-TE signaling is proposed. As shown in FIG. 1, the expression way of the unnumbered link in an explicit route object (referred to as ERO) extends an unnumbered interface sub-object, and the expression way in other objects is similar thereto, which uses a two-tuple of router ID and interface to represent the unnumbered link resources. Because the unnumbered link resources in the signaling do not have the area ID information, it must require that the router ID is unique in all areas. In the corresponding routing protocolOpen Shortest Path First-Traffic Engineer (OSPF-TE), the flooding resources are represented with the routing area information, therefore, from the aspect of routing protocol, the router ID is limited within the area, and only needs to be unique in the area, for different areas, their router IDs may be the same value.

In the RFC3209, an Autonomous system number (abbreviated to as AS) sub-object is defined in the ERO to indicate that the next routing hop is a certain area, because it is a sub-object separated from the unnumbered interface sub-object, it has no restriction capability on the content of the unnumbered interface sub-object, and cannot be combined with the unnumbered interface sub-object, thus making the router ID unique only in the area. In addition, the object is not defined in the record route object (referred to as RRO), and an AS number defined by it only has two bytes, while an area ID defined in the OSPF-TE generally has four bytes, therefore the AS sub-object also needs to extend the field length.

The unnumbered interface in the RSVP-TE signaling protocol does not have the area ID, another problem brought about is that the RSVP-TE protocol processing module cannot determine the boundary nodes of the local area when the first node in each area establishes an intra-area service, and must inform the routing processing module of all subsequent routing information, and the routing processing module determines the boundaries of the local area, which increases the message processing overhead and reduces the service establishment speed.

SUMMARY

The present document provides a method and system for processing RSVP-TE signaling to reduce router ID resource consumption.

The present document provides a method for processing resource reservation protocol-traffic engineer (RSVP-TE) signaling, comprising:

extending an object using unnumbered resources within an RSVP-TE signaling, representing link resources in the signaling with a triple consisted of an area ID, a router ID and an interface;

when configuring network resources, configuring each area ID to be different, while an intra-area router ID to be unique; and, representing resources in a signaling message with the triple when applying cross-area services.

Alternatively, the abovementioned method further has the following feature: the extended object using unnumbered resources comprises:

A sub-object of an explicit route object;
A resource reservation hop object;
An error information object; and
A label switched path tunnel interface numbered object.

Alternatively, the abovementioned method further has the following feature: said extending an object using unnumbered resources within an RSVP-TE signaling comprises:

extending a field of the area ID of the object using the unnumbered resources within the RSVP-TE signaling, and extending the router ID to be unique in the area.

Alternatively, the abovementioned method further has the following feature: said configuring network resources further comprises:

using an opaque link state advertisement (LSA) in an Open Shortest Path First-Traffic Engineer (OSPF-TE) protocol to represent intra-area and inter-area resources.

Alternatively, the abovementioned method further has the following feature: said representing resources in a signaling message with the triple when applying cross-area services comprises one or more of the following:

in cross-area service establishment and status update, representing the resources in the signaling message with the triple;

when notifying information between cross-area service network elements, representing a fault location in the signaling message with the triple; and when establishing unnumbered forwarding adjacencies by means of signaling for the cross-area service, representing with the triple.

The present document further provides a system for processing resource reservation protocol-traffic engineer (RSVP-TE) signaling, comprising:

an extension module, configured to extend an object using unnumbered resources within an RSVP-TE signaling, and represent link resources in the signaling with a triple consisted of an area ID, a router ID and an interface;

a configuration module, configured to: when configuring network resources, configure each area ID to be different, while an intra-area router ID to be unique; and, a processing module, configured to: represent resources in a signaling message with the triple when applying cross-area services.

Alternatively, the abovementioned system further has the following feature: the object using unnumbered resource and extended by the extension module comprises:

A sub-object of an explicit route object;
A resource reservation hop object;
An error information object; and
A label switched path tunnel interface numbered object.

Alternatively, the abovementioned system further has the following feature:

the extension module extends an object using non-numbered resources within an RSVP-TE signaling in the following manner: extending a field of the area ID of the object using unnumbered resources within the RSVP-TE signaling, and extending the router ID to be unique in the area.

Alternatively, the abovementioned system further has the following feature:

the configuration module configures the network resources also in the following manner: using an opaque LSA in an Open Shortest Path First-Traffic Engineer protocol to represent inter-area and intra-area resources.

Alternatively, the abovementioned system further has the following feature:

the processing module is configured to represent resources in a signaling message with the triple when applying cross-area services through one or more of the following manners: in cross-area service establishment and status update, representing the resources in the signaling message with the triple; when notifying information between the cross-area service network elements, representing a fault location in the signaling message with the triple; and when establishing unnumbered forwarding adjacencies by means of signaling for the cross-area service, representing with the triple.

The embodiment of the present document provides a method and system for processing RSVP-TE signaling, it is to carry an area ID in the RSVP-TE unnumbered interface to make the area ID and router ID work together, on the one hand, it is to remove the restriction that the signaling requires the router ID to be unique in the area to ensure that router IDs in different areas can be reused, thus expanding the value range of the router ID in the area and reducing the router ID resource consumption; on the other hand, it is to directly determine the boundary nodes of the area in the routing information of the signaling, thus increasing the service signaling processing speed.

PREFERRED EMBODIMENTS OF THE INVENTION

Hereinafter in conjunction with the accompanying drawings, the embodiments of the present document will be described in detail. Please be noted that in the case of no conflict, embodiments and features in the embodiments of the present application may be arbitrarily combined with each other.

Figures 1, 2, 3:
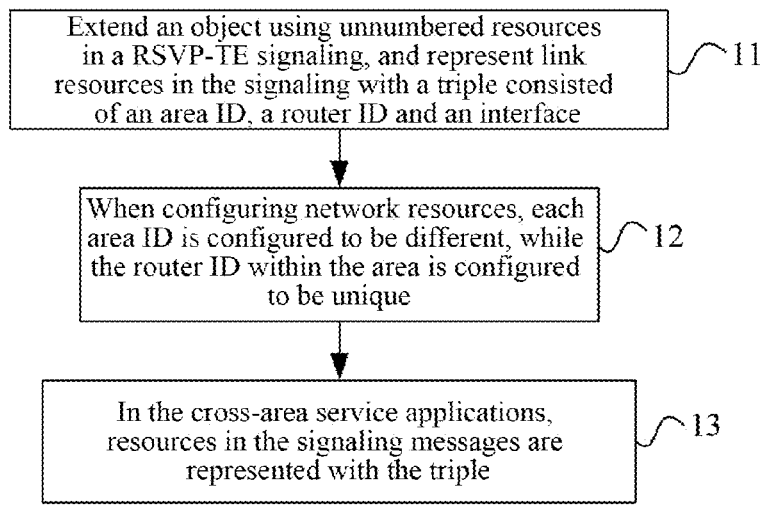
FIG. 1 is a schematic diagram of an unnumbered link in the ERO defined in RFC 3477.
FIG. 2 is a flow chart of a method for processing RSVP-TE signaling in accordance with an embodiment of the present document.
FIG. 3 is an extension diagram of an unnumbered interface in an ERO sub-object in accordance with an embodiment of the present document.

FIG. 2 is a flow chart of a method for processing RSVP-TE signaling in accordance with an embodiment of the present document, as shown in FIG. 1, the method of the present embodiment comprises the following steps:

in step 11, it is to extend an object using unnumbered resources in a RSVP-TE signaling, and represent link resources in the signaling with a triple consisted of an area ID, a router ID and an interface;

in the present embodiment, the way of representing link resources in the signaling with a two-tuple consisted of a router ID and an interface is changed to a way of representing with a triple consisted of an area ID, a router ID, and an interface;

the extension part may comprise: an unnumbered interface sub-object in ERO, RRO, XRO (Exclude Route) objects, an LSP_TUNNEL_INTERFACE_ID (Label Switched Path tunnel interface ID) object, an RSVP_HOP (resource reservation hop) object and an ERROR_SPEC (error information) object, and the IF_ID_TLV and the area TLV in the TLV (Type length value) in the RSVP_HOP object and the RROR_SPEC object can be used jointly to represent the triple information of the area ID, router ID and interface.

11.1 Extend ERO Sub-Object

As shown in FIG. 3, L being 0 indicates strict route hop, being 1 means loose route hop, there is no extension herein;

the unnumbered interface ID of the Type field in the RFC3477 is 4, its newly-extended ID needs to be re-defined and should be applied from the Internet Assigned Numbers Authority (IANA);

the unnumbered interface ID of the Length field in the RFC3477 is 12, its newly-extended ID is 16.

the Area ID field is the newly-extended area ID field;

the Router ID field indicates the router ID, and its newly-extended representation only needs to be unique within an area;

the Interface ID field indicates the internal interface address of the router and is allocated inside the router.

11.2 Extend RRO Sub-Object

Figure 4:
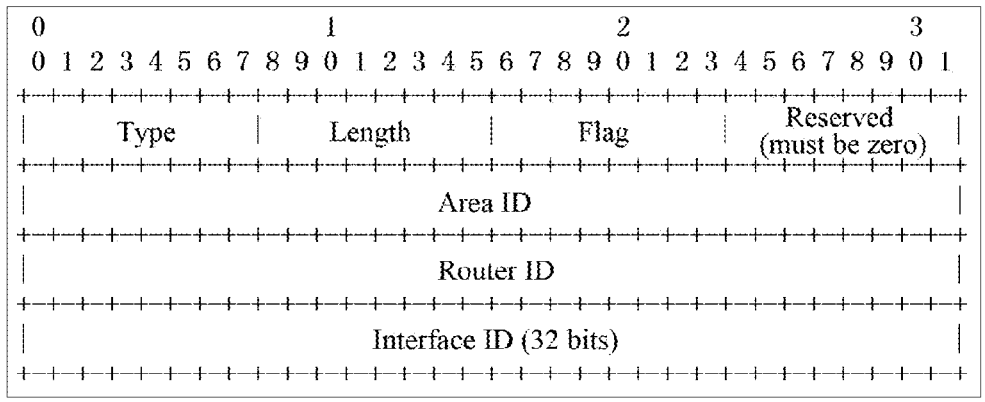
FIG. 4 is an extension diagram of an unnumbered interface in an ERO sub-object in accordance with an embodiment of the present document.

As shown in FIG. 4, the unnumbered interface ID of the Type field in the RFC3477 is 4, its newly-extended ID needs to be re-defined and should be applied from the IANA;

the unnumbered interface ID of the Length field in the RFC3477 is 12, its newly-extended ID is 16.

The ID of the Flag field is the same as the ID of the unnumbered interface sub-object in the RFC3477, there is no extension here;

the Area ID field is the newly-extended area ID field;

the Router ID field indicates the router ID, and its newly-extended representation only needs to be unique within the area;

the Interface ID field indicates the internal interface address of the router and is allocated within the router.

Figure 5:
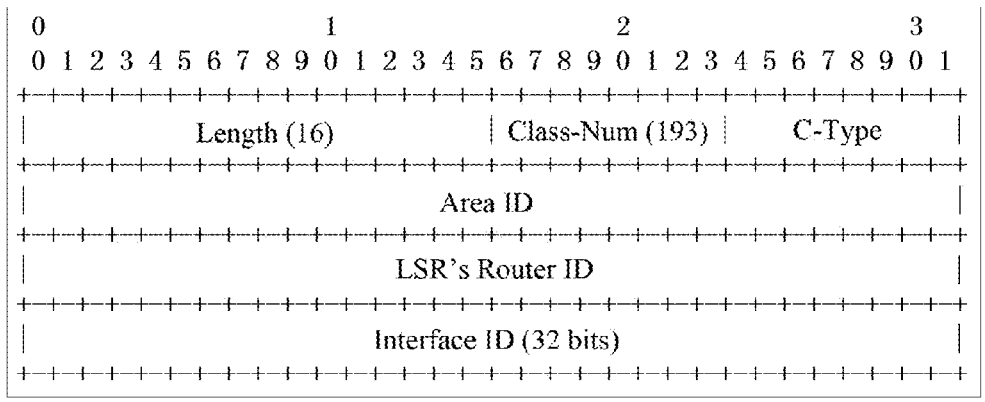
FIG. 5 is an extension diagram of an unnumbered interface in an LSP_TUNNEL_INTERFACE_ID object defined in RFC 3477 in accordance with an embodiment of the present document.

11.3 Expand LSP_TUNNEL_INTERFACE_ID Object the LSP_TUNNEL_INTERFACE_ID object has two representations ways for the unnumbered interface, the LSP_TUNNEL_INTERFACE_ID object defined in the RFC3477 Section 3.1 is extended, as shown in FIG. 5:

the unnumbered interface ID of the Length field in the RFC3477 is 12, and its newly-extended ID is 16;

the Class-Num (DOI) field is the LSP_TUNNEL_INTERFACE_ID object value, and it is 193 and cannot be changed;

the value of the C-Type (type number) field in RFC3477 is 1, its newly-extended value needs to be re-defined and should be applied from the LANA;

the Area ID field is the newly-extended area ID field.

The LSR's Router ID field indicates the router ID, and its newly-extended representation only needs to be unique within the area.

The Interface ID field indicates the internal interface address of the router and is allocated within the router.

Figure 6:
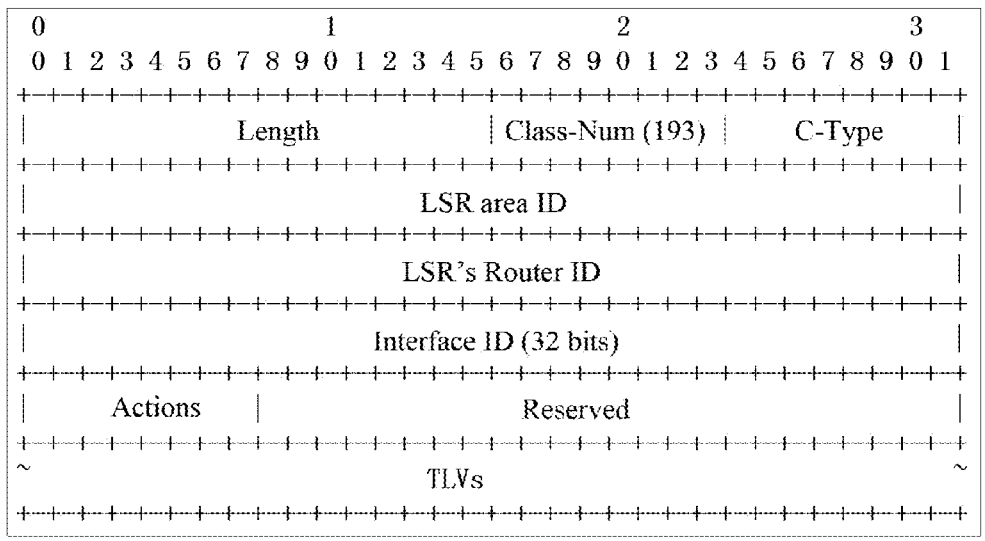
FIG. 6 is an extension diagram of an unnumbered interface in an LSP_TUNNEL_INTERFACE_ID object defined in RFC 6107 in accordance with an embodiment of the present document.

In the RFC6107 Section 3.1.2, changes on the LSP_TUNNEL_INTERFACE_ID object are made, herein the unnumbered interface representation way in RFC6107 is newly extended, as shown in FIG. 6:

the meaning of the Length field is the same as its counterpart in the RFC6107, indicating the length of the entire object;

the Class-Num field is the LSP_TUNNEL_INTERFACE_ID object value, it is 193 and cannot be changed;

the value of C-Type field in the RFC6107 is 4, and its newly-extended value needs to be re-defined and should be applied from the IANA;

the Area ID field is the newly-extended area ID field.

the LSR's Router ID field indicates the router ID, and its newly-extended representation only needs to be unique within the area.

The Interface ID field indicates the internal interface address of the router and is allocated within the router;

the Actions field is consistent with its counterpart in RFC6107;

TLVs are not extended.

In step 12, when configuring network resources, each area ID is configured to be different, while the router ID within the area is configured to be unique;

For the router ID allocation, it is uniquely allocated within the area, and is inter-area and intra-area flooded through the routing protocol, intra-area nodes acquire the intra-area resource information, and inter-area nodes acquire inter-area resource information, and nodes in different areas are divided into different nodes through their area IDs and its router IDs in combination;

the routing protocol area division can use the representation way of directly using the area in the protocol header, or the way described in Chapter 2 of draft-ietf-ccamp-rfc5787bis, different levels of areas are distinguished with protocol processing instances, and it only needs to distinguish that unnumbered resources exist in different areas, the router ID of each area may be the same; the inter-area link in the OSPF-TE routing flooding uses the way for representing the Remote AS Number sub-TLV defined in the RFC5392.

The division configuration of the routing protocol OSPF-TE area is as follows:

each area ID is different, but the router ID in the area can be consistent with router IDs in other areas.

The opaque link-state advertisement (referred to as LSA) in the OSPF-TE protocol is used to represent intra-area and inter-area resources. The router information is represented with Router Address Top Level TLV whose type is 1 in the Opaque LSA, see RFC3630. The link resources are represented with Link Top Level TLV whose type is 2 in the Opaque LSA, see RFC3630.

The local/remote interfaces of the unnumbered link are represented with the Link Local/Remote Identifiers sub-TLV whose type is 11 defined in the RFC4203 under Link TLV, and the local and remote router IDs are represented with the Local and Remote TE Router ID sub-TLVs defined in the draft-ietf-ccamp-rfc5787bis under Link TLV, the remote area ID is represented with the local Remote AS Number sub-TLV defined in RFC5392 under Link TLV.

The Area ID field in the OSPF-TE message header can be used to indicate the local area ID, or the way described in Chapter 2 in the draft-ietf-ccamp-rfc5787bis, different levels of areas can be distinguished with protocol processing instances.

Figure 7:
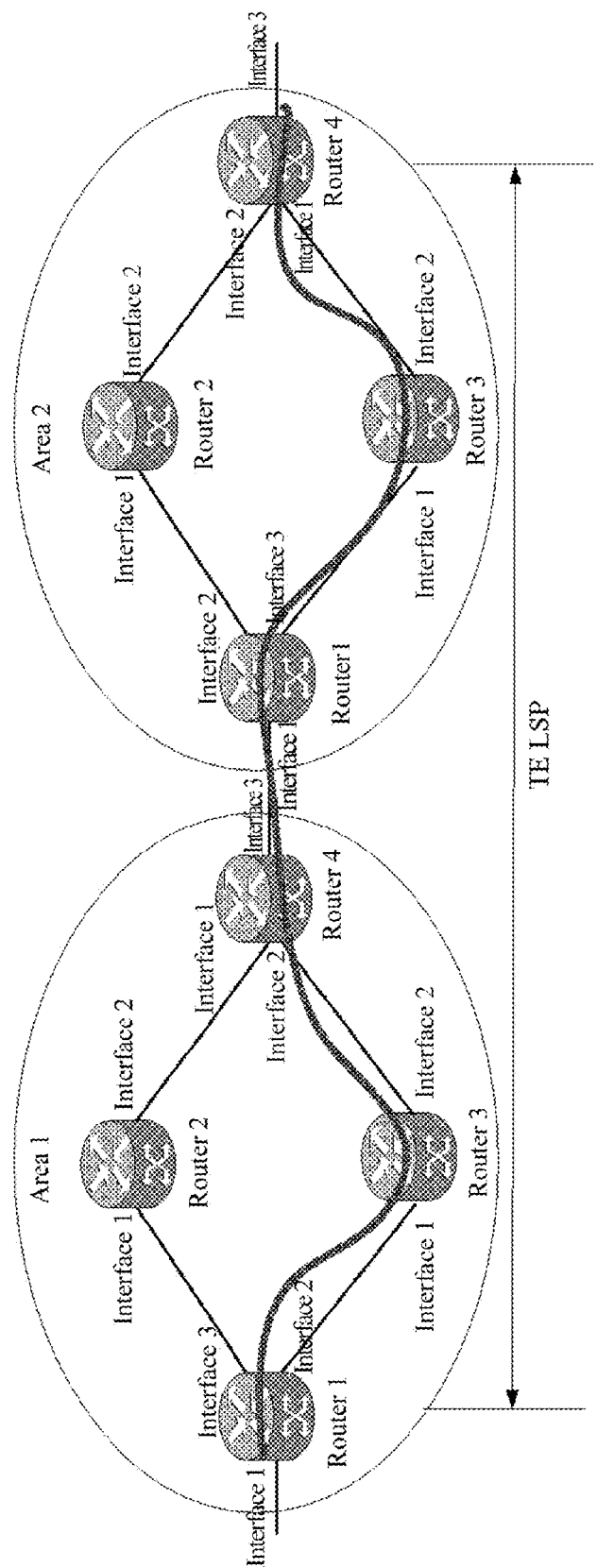
FIG. 7 is a schematic diagram of a topology with two areas and eight network elements in accordance with an embodiment of the present document.

Accordingly, as shown in FIG. 7, areas 1 and 2 respectively have four routers, whose IDs are configured as router 1, router 2, router 3, and router 4. For the intra-area unnumbered link between the router 1 and the router 3 in the area 1, in the OSPF-TE message of the router 1, the local interface is 2, the remote interface is 1, the local router ID is 1, the remote router ID is 3, and the remote area ID is 1. For the inter-area unnumbered link between the router 4 in the area 1 and the router 1 in the area 2, in the OSPF-TE message in the router 4 in the area 1, the local interface is 3, the remote interface is 1, the local router ID is 4, the remote router ID is 1, and the remote area ID is 2.

In step 13, in the cross-area service applications, resources in the signaling messages can be represented with the triple.

In the cross-area service establishment and status update, the representation way of resources in the signaling message uses the way of the extended unnumbered interface;

the first node in the area receives the PATH message of the RSVP signaling, parses the ERO object therein and determines the local area path information and intra-area tail node of the service, which can be completed by directly comparing the area IDs: the set of all unnumbered interface sub-objects that have the same area ID of the local node is the local area path information, the last unnumbered interface sub-object that has the same area ID of the local node points out the boundary node of the local area, so that there is no need to submit the ERO to the routing processing module to process;

through the RRO object in the received PATH message, the tail node in the area can determine the path that the services in the local area pass through, and the set of all unnumbered interface sub-objects that have the same area ID of the local node is the local area path information;

through the RRO object in the received PATH message, the first node in the area can determine the path that the services in the local area actually pass through, and the set of all unnumbered interface sub-objects that have the same area ID of the local node is the local area actual path information;

the RSVP_HOP object in the PATH message represents the egress-interface resource location of the node sending messages, the RSVP_HOP object in the RESV message represents the egress-interface resource location of the node sending messages in the opposite direction, the IF_ID_TLV is added in the RSVP_HOP object to represent the unnumbered link location, RFC4920 Section 6.2 extends a series of TLVs and uses the OSPF area (REPORTING_OSPF_AREA) TLV therein to represent the area where the unnumbered link is located in the IF_ID, the IF_ID_TLV and the REPORTING_OSPF_AREA TLV are used together in the RSVP_HOP object to represent the unnumbered interface resources.

The extended RSVP-TE message processing is as follows:

as shown in FIG. 7, the thick line indicates establishing a cross-area Traffic Engineer-Label Switched Path (called TE-LSP), and the unnumbered link resources are used, each hop on the path is represented as a triple of an area ID, a router ID, and an interface, it is to consider using the strict explicit path, the path in the figure is <area 1, router 1, interface 1>, <area 1, router 1, interface 2>, <area 1, router 3, interface 1>, <area 1, router 3, interface 2>, <area 1, router 4, interface 2>, <area 1, router 4, interface 3>, <area 2, router 1, interface 1>, <area 2, router 1, interface 3>, <area 2, router 3, interface 1>, <area 2, router 3, interface 2>, <area 2, router 4, interface 1>, <area 2, router 4, interface 3>. The positive direction refers to a direction for the PATH message sending and processing, and the opposite direction refers to a direction for the RESV message sending and processing. Subsequent objects such as ERO and RRO use the description way of the triple of the extended area ID, router ID, and interface in 1.

13.1 PATH Message Processing:

In accordance with the method for processing the ERO and RRO in the RFC3209 chapters 4.3 and 4.4, after processing the PATH message, each node removes the interfaces associated with the local node from the ERO in the PATH message sent to downstream, and adds the egress-interface of the local node into the RRO object in the manner of pushing. The TLV in the RSVP_HOP object indicates the egress-interface of the node sending the PATH message.

After the router 1 in the area 1 acquires the cross-area path, by comparing the area IDs, those routing hops consistent with its area ID, <area 1, router 1, interface 1>, <area 1, router 1, interface 2>, <area 1, router 3, interface 1>, <area 1, router 3, interface 2>, <area 1, router 4, interface 2>, and <area 1, router 4, interface 3>, are the link interface resources to be used by the TE-LSP to establish services in the area 1. <area 1, router 4, interface 3> works as the last routing hop which the same area ID, indicating that it is the boundary link of the TE-LSP in the area 1, and the router 4 of the area 1 is the last node in the area 1. The ERO in the PATH message sent by the router 1 in the area 1 uses the extended unnumbered interface sub-object in the abovementioned 1.1, and in the ERO, it only needs to comprise the egress-interface of each node, then it is represented as <area 1, router 3, interface 2>, <area 1, router 4, interface 3>, <area 2, router 1, interface 3>, <area 2, router 3, interface 2>, and <area 2, router 4, interface 3>, the IF_ID_TLV in its RSVP_HOP object is represented as <router 1, interface 2>, and the REINTERFACEING_OSPF_AREA TLV is the area 1.

In the PATH message received by the Router 4 in the area 1, the RRO is <area 1, router 1, interface 2>, <area 1, router 3, interface 2>, ERO is <area 1, router 4, interface 3>, <area 2, router 1, interface 3>, <area 2, router 3, interface 2>, and <area 2, router 4, interface 3>, the router 4 in the area 1 processes and learns that the egress-interface of the local node is the interface 3, then it can learn that the entire path in the area 1 is <area 1, router 1, interface 2>, <area 1, router 3, interface 2>, and <area 1, router 4-interface 3>. In the PATH message sent by the router 4 in the area 1, the ERO is represented as <area 2, router 1, interface 3>, <area 2, router 3, interface 2>, and <area 2, router 4, interface 3>, and the IF_ID_TLV in the RSVP_HOP object is represented as <router 4, interface 3>, and the REPORTING_OSPF_AREA TLV is the ID of the area 1.

After the router 1 in the area 2 receives the PATH message, the RSVP-TE processing module can directly determine the path of the TE-LSP in the area 2 from the ERO, and does not need to determine after submitting all the EROs to the routing processing module to process, the path in the area 2 is <area 2, router 1, interface 3>, <area 2, router 3, interface 2>, and <area 2, router 4, interface 3>.

In the PATH messages received by the router 4 in the area 2, the RRO is represented as <area 1, router 1, interface 2>, <area 1, router 3, interface 2>, <area 1, router 4, interface 3>, <area 2, router 1, interface 3>, and <area 2, router 3, interface 2>, the ERO is represented as <area 2, router 4, interface 3>, combined with the part where the area IDs are consistent in the ERO and the RRO, the router 4 in the area 2 learns that the path in the local area is <area 2, router 1, interface 3>, <area 2, router 3, interface 2>, and <area 2, router 4, interface 3>, and there is no need to acquire information from the routing processing module.

13.2 RESV Message Processing:

the tail node responds to the PATH message and sends a RESV message carrying the RRO information to the upstream, each node adds its own egress-interface in the opposite direction into the RRO through the manner of information of pushing, and the RRO carries the actual path of the TE-LSP. The TLV in the RSVP_HOP object indicates the egress-interface of the node sending the RESV message in the opposite direction.

After the Router 4 in the area 2 is determined as the tail node of the TE-LSP, an RESV message is sent to the upstream, the RRO is <area 2, router 4, interface 1>, the IF_ID_TLV in the RSVP_HOP object is represented as <router 4, interface 1>, and the REPORTING_OSPF_AREA TLV is the area 2.

The router 3 in the area 2 continues to send the RESV message to the upstream, and adds its own egress-interface in the opposite direction into the RRO as <area 2, router 3, interface 1> and <area 2, router 4, interface 1>, the IF_ID_TLV in the RSVP_HOP object is represented as <router 3, interface 1>, and the REPORTING_OSPF_AREA TLV is the area 2.

After receiving a RESV, as the first node of the area, the router 1 in the area 2 can acquire the actual path of the TE-LSP in the area from the RESV message, and combined with the egress-interface in the opposite direction, the actual path in the area 2 is <area 2, router 1, interface 1>, <area 2, router 3, interface 1> and <area 2, router 4, interface 1>. In the sent RESV message, the RRO is <area 2, router 1, interface 1>, <area 2, router 3, interface 1>, and <area 2, router 4, interface 1>, the IF_ID_TLV in the RSVP_HOP object is represented as <router 1, interface 1>, and the REPORTING_OSPF_AREA TLV is the area 2.

After respectively receiving the RESV message, the router 4 and router 3 in the area respectively add their own egress-interfaces in the opposite direction into the RRO and forward the RESV messages to the upstream.

after receiving the RESV message, as the first node of the TE-LSP, the router 1 in the area acquires, from the RRO, all the actual paths: <area 1, router 3, interface 1>, <area 1, router 4, interface 2>, <area 2, router 1, interface 1>, <area 2, router 3, interface 1>, and <area 2, router 4, interface 1>, and discriminates the actual path of the local area.

13.3 when Notifying Messages Between the Cross-Area Service Network Elements, the Fault Location in a Signaling Message is Represented with the Extended Unnumbered Interface Mode;

in the cross-area services, each network element can notify other network elements of relevant information via the NOTIFY or PATHERR signaling message, wherein the fault related information carries the specific unnumbered link location where the failure occurs through the IF_ID_TLV in the ERROR_SPEC object, and newly adds the REPORTING_OSPF_AREA TLV in the ERROR_SPEC object to represent the area where the unnumbered link is located in the IF_ID.

The NOTIFY and PATHERR message processing is as follows:

As shown in FIG. 7, the router 3 in the area 1 in the TE-LSP detects that the interface 2 fails, and uses the NOTIFY message or the PATHERR to send the fault information to the upstream, the IF_ID TLV in the message ERROR_SPEC object is represented as <router 3, interface 2>, the REPORTING_OSPF_AREA TLV is the area 1.

13.4 when the Cross-Area Services Establishes Unnumbered Forwarding Adjacencies (Referred to as FA) by Means of Signaling, the Extended Unnumbered Interface Mode is Used;

the signaling way is used to establish the unnumbered forwarding adjacencies, after adding the area ID in the LSP_TUNNEL_INTERFACE_ID, it supports establishing FA links between different network elements in the area or cross the areas.

The message processing of the FA establishment is as follows:

as shown in FIG. 7, the TE-LSP eventually leads to the cross-area FA establishment, the router 1 in the area 1 uses the extended LSP_TUNNEL_INTERFACE_ID object in 1.3 in the PATH message, the value of the area ID is 1, the router ID is 1, the interface is allocated by itself, assuming that the allocated interface is 4.

The router 4 in the area 2 uses the extended LSP_TUNNEL_INTERFACE_ID object in 1.3 in the responded RESV message, the value of the area ID is 2, the router ID is 4, the interface is allocated by itself, assuming that the allocated interface is 4.

Therefore, in the figure, the TE-LSP is established from <area 1, route 1, interface 1> to <area 2, route 4, interface 3>, resulting in that a traffic engineer link from <area 1, route 1, interface 4> to <area 2, route 4, interface 4> is eventually established.

The embodiment of the present document extends the unnumbered link resource representation way in the RSVP-TE signaling, compared with the related art, it is to remove the restriction that the signaling requires the router ID to be unique in the area by adding an area ID, thus expanding the value range of the router ID in the area and reducing the router ID resource consumption. Because all the path information uses a mode of a triple of an area ID, a router ID, and an interface and they are placed in order, routing hops in the same area are placed together, and their area IDs are the same, while the first routing hop and the last routing hop with the same area ID represent the boundary nodes of the area, so that the signaling processing module can directly determine the boundary nodes of the area from the RSVP message, reducing the interaction with the routing processing module and increasing the boundary network element signaling processing speed.

Figure 8:
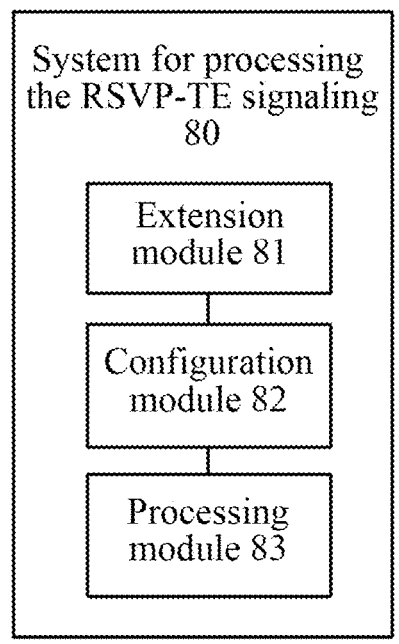
FIG. 8 is a schematic diagram of a system for processing RSVP-TE signaling in accordance with an embodiment of the invention.

FIG. 8 is a schematic diagram of system 80 for processing RSVP-TE signaling in accordance with an embodiment of the present document, as shown in FIG. 8, the system of the present embodiment comprises:

An extension module 81, configured to extend an object using unnumbered resources within an RSVP-TE signaling, represent link resources in the signaling with a triple consisted of an area ID, a router ID and an interface;

A configuration module 82, configured to: when configuring network resources, configure each area ID to be different, while an inter-area router ID to be unique; and, A processing module 83, configured to: in cross-area service applications, represent resources in a signaling message with the triple when applying cross-area services.

Wherein, the object using unnumbered resources and extended by the extension module comprises:

A sub-object of an explicit route object;
An RSVP_HOP object;
An ERROR_SPEC object;
A label switched path tunnel interface ID object.

Of course, the extended object using the unnumbered resources may also comprise other objects.

Wherein, the extension module extending the object using the non-numbered resources within the RSVP-TE signaling comprises: extending a field of the area ID of the object using unnumbered resources within the RSVP-TE signaling, and extending the router ID to be unique in the area.

In a preferred embodiment, the configuration module, in the network resource configuration process, is further used to: use an opaque LSA in an Open Shortest Path First-Traffic Engineer protocol to represent inter-area and intra-area resources.

Wherein, the processing module is configured to represent resources in a signaling message with the triple when applying cross-area services by means of one or more of the following: in the cross-area service establishment and status update, representing the resources in the signaling message with the triple; when notifying information between the cross-area service network elements, representing a fault location in the signaling message with the triple; and when establishing unnumbered forwarding adjacencies by means of signaling for the cross-area service, representing with the triple.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only preferred embodiments of the present document, and of course, the present document may also have other various embodiments, without departing from the spirit and essence of the present document, a person skilled in the art may make various corresponding changes and modifications according to the present document, and these corresponding changes and modifications should be included within the protection scope of the appended claims of the present document.

INDUSTRIAL APPLICABILITY

The embodiment of the present document provides a method and system for processing RSVP-TE signaling, it is to carry an area ID in the RSVP-TE unnumbered interface to allow the area ID and router ID working together, on the one hand, it is to remove the restriction that the signaling requires the router ID to be unique in the area to ensure that router IDs in different area can be reused, thus expanding the value range of the router ID in the area and reducing the router ID resource consumption; on the other hand, it is to directly determine the boundary nodes of the area in the routing information of the signaling, thus increasing the service signaling processing speed.

What is claimed is:

1. A method for processing resource reservation protocol-traffic engineer (RSVP-TE) signaling, comprising:
    receiving, by a plurality of nodes which form a cross-area link in a network, a PATH message in a RSVP-TE signaling, wherein the PATH message includes an Explicit Route Object (ERO) and a Record Route Object (RRO) both of which use unnumbered resources;
    extending the ERO and the RRO, wherein the ERO and the RRO respectively include a triple consisted of an area identifier (ID), a router ID and an interface for representing link resources;
    each of the nodes processing the PATH message, the processing includes: removing the interface associated with the current node from the ERO in the PATH message, and adding an egress-interface of the current node into the RRO;
    sent, by each of the nodes, the processed PATH message to a downstream node;
    wherein each of the nodes receives the PATH message including the extended ERO and RRO, and a head node and a tail node in each area can determine directly local area path information and a boundary node according to the extended ERO and RRO.

2. The method of claim 1, wherein, the extended object using unnumbered resources further comprises:
    a resource reservation hop object;
    an error information object; and
    a label switched path tunnel interface numbered object.

3. The method of claim 1, wherein, said extending the ERO and RRO further comprises:
    adding a field of the area ID into the ERO and RRO using the unnumbered resources within the RSVP-TE signaling, so that it is just required to ensure that router IDs of various nodes in the local area are different from each other.

4. The method of claim 2, wherein, said extending the ERO and RRO further comprises:
    adding a field of the area ID into the ERO and RRO using the unnumbered resources within the RSVP-TE signaling, so that it is just required to ensure that router IDs of various nodes in the local area are different from each other.

5. A system for processing resource reservation protocol-traffic engineer (RSVP-TE) signaling, comprising a plurality of nodes which form a cross-area link in a network, wherein each of the nodes comprises hardware performing instructions stored in a non-transitory computer readable medium which executes the following steps:
    receiving, by a plurality of nodes which form a cross-area link in a network, a PATH message in a RSVP-TE signaling, wherein the PATH message includes an Explicit Route Object (ERO) and a Record Route Object (RRO) both of which use unnumbered resources;
    extending the ERO and the RRO, wherein the ERO and the RRO respectively include a triple consisted of an area identifier (ID), a router ID and an interface for representing link resources;
    each of the nodes processing the PATH message, the processing includes: removing the interface associated with the current node from the ERO in the PATH message, and adding an egress-interface of the current node into the RRO;
    sent, by each of the nodes, the processed PATH message to a downstream node;
    wherein each of the nodes receives the PATH message including the extended ERO and RRO, and a head node and a tail node in each area can determine directly local area path information and a boundary node according to the extended ERO and RRO.

6. The system of claim 5, wherein, the extended object using unnumbered resource further comprises:
    a resource reservation hop object;
    an error information object; and
    a label switched path tunnel interface numbered object.

7. The system of claim 5, wherein, said extending the ERO and RRO further comprises:
    adding a field of the area ID into the ERO and RRO using the unnumbered resources within the RSVP-TE signaling, so that it is just required to ensure that router IDs of various nodes in the local area are different from each other.

8. The system of claim 6, wherein, said extending the ERO and RRO further comprises:
    adding a field of the area ID into the ERO and RRO using the unnumbered resources within the RSVP-TE signaling, so that it is just required to ensure that router IDs of various nodes in the local area are different from each other.

* * * * *